United States Patent [19]

Lipfert et al.

[11] Patent Number: 5,579,325
[45] Date of Patent: Nov. 26, 1996

[54] METHOD AND APPARATUS FOR TRANSMITTING DATA SIGNALS OVER PARALLEL DATA LINES

[75] Inventors: Reinhard Lipfert, Krefeld; Kai Garweg, Duisburg, both of Germany

[73] Assignee: Siemens Aktiengesellschaft, Munich, Germany

[21] Appl. No.: 343,026

[22] Filed: Nov. 21, 1994

[30] Foreign Application Priority Data

Nov. 19, 1993 [DE] Germany .......................... 43 39 463.9

[51] Int. Cl.$^6$ .................. H04J 3/06; H04L 7/00
[52] U.S. Cl. ................ 370/105.2; 370/106; 370/108; 375/365
[58] Field of Search .................. 370/58.1, 58.2, 370/66, 85.1, 100.1, 105, 105.2, 105.3, 105.5, 106, 107, 108, 110.1, 112; 375/356, 362, 365, 366, 368

[56] References Cited

U.S. PATENT DOCUMENTS

| 3,603,735 | 9/1971 | Cleobury ............................... 370/106 |
| 4,383,316 | 5/1983 | Seidel ...................................... 370/118 |
| 4,658,397 | 4/1987 | Kawamura et al. ................ 370/100.1 |
| 4,984,251 | 1/1991 | Perloff et al. ........................... 370/108 |
| 5,043,982 | 8/1991 | Werner .................................... 370/108 |
| 5,177,739 | 1/1993 | Basnuevo et al. .................... 370/100.1 |
| 5,229,998 | 7/1993 | Weisser ................................... 370/108 |

FOREIGN PATENT DOCUMENTS

| 3244330 | 8/1990 | Germany . |
| 3114066 | 9/1993 | Germany . |

OTHER PUBLICATIONS

Data Communications, Sep. 1993, pp. 108–114 (Turner) "Inverse Muxes: High Bandwidth, Low Cost".

Primary Examiner—Alpus H. Hsu
Attorney, Agent, or Firm—Herbert L. Lerner; Laurence A. Greenberg

[57] ABSTRACT

A method and an apparatus for data transmission permit a time offset between individual transmission channels in a multichannel transmission system (ISDN) to be ascertained in a simple manner. After an initialization of the receiving channels, a numerical sequence is simultaneously sent from the transmitter over all of the channels. If a value is received at the receiver over all of the channels which is different from the initializing value, the relative time offset between the channels can be ascertained directly from the received values.

4 Claims, 2 Drawing Sheets

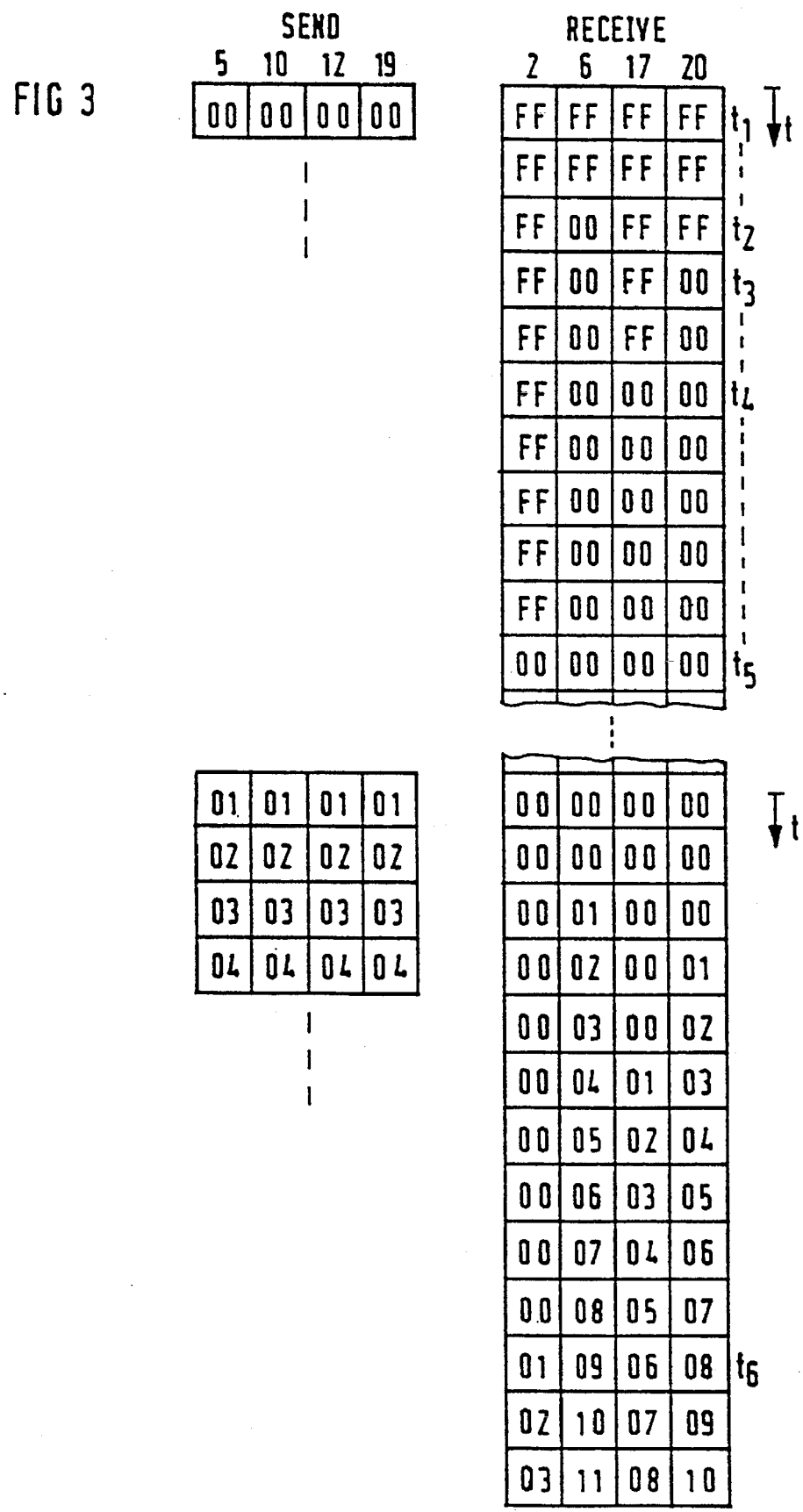

METHOD AND APPARATUS FOR TRANSMITTING DATA SIGNALS OVER PARALLEL DATA LINES

BACKGROUND OF THE INVENTION

1. Field of the Invention

The invention relates to a method and an apparatus for data transmission in a system having n transmission channels, a transmitting and a receiving station, m channels ($n \geq m \geq 0$) being used for data transmission, and a partial data transmission being effected over each of the m channels.

An exchange of data between two data stations is typically enabled by means of a modem over a data channel for remote data transmission. However, the transmission rate in such methods is dependent on the bandwidth of the channel.

In modern systems, such as ISDN, a connection with a transmission rate of 64 kbit/sec can be made available to a subscriber. So-called multiplex connections with 30 such channels are also provided. In order to increase the transmission rate of 64 kbit/sec, a data packet to be transmitted can, for instance, be divided into individual partial data packets and transmitted simultaneously over a plurality of channels. Thus a transmission rate over 30 channels of up to 1920 kbit/sec is possible.

However, a disadvantage of the above-described method is that the individual channels have different delay times in data transmission, so that the partial data signals that arrive at the receiver are staggered in time relative to one another.

2. Summary of the Invention

It is accordingly an object of the invention to provide a method and an apparatus for data transmission, which overcome the hereinafore-mentioned disadvantages of the heretofore-known methods and devices of this general type and which enable data transmission over a number of channels to be carried out as simply as possible.

With the foregoing and other objects in view there is provided, in accordance with the invention, in a method for data transmission in a system having n transmission channels, a transmitting and a receiving station, m channels ($n \geq m \geq 0$) for transmitting data, and each of the m channels effecting a partial data transmission, the improvement which comprises ascertaining a time offset with the receiving station over the transmission channels during an initializing phase, by simultaneously transmitting a predetermined starting value from the transmitting station to all of the channels; transmitting a confirmation signal from the receiving station over at least one of the channels to the transmitting station, if all of the channels in the receiving station have received the predetermined starting value; transmitting a numerical sequence from the transmitting station over all of the channels, beginning with a predetermined value, after receiving the confirmation signal; and ascertaining and taking into account the time offset between the various channels for an ensuing data transmission at the receiving station from the relative offset of the data values received in the various channels, after a starting value having a different value than the predetermined starting value has been received over all of the channels.

In accordance with another mode of the invention, there is provided a method which comprises generating a numerical succession with a pattern generator circuit in the transmitting station.

With the objects of the invention in view, there is also provided in a system having n transmission channels, a transmitting and a receiving station, m channels ($n \geq m \geq 0$) for transmitting data, and each of the m channels effecting a partial data transmission, an apparatus for data transmission, comprising an address memory, a data memory and control means in the receiving station; the address memory storing ascertained time offset values to form offset addresses; the data memory sequentially storing received data under control of the control means; the control means controlling addressing and reading out of the data memory with the offset addresses stored in the address memory; and the control means assigning the read-out data to an output channel.

In accordance with a concomitant feature of the invention, there is provided a pattern generator circuit in the transmitting station for generating a numerical succession.

Other features which are considered as characteristic for the invention are set forth in the appended claims.

Although the invention is illustrated and described herein as embodied in a method and an apparatus for data transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a table using four transmission channels to show a time course of a synchronizing method according to the invention.

DESCRIPTION OF THE PREFERRED EMBODIMENTS

Figure 1:
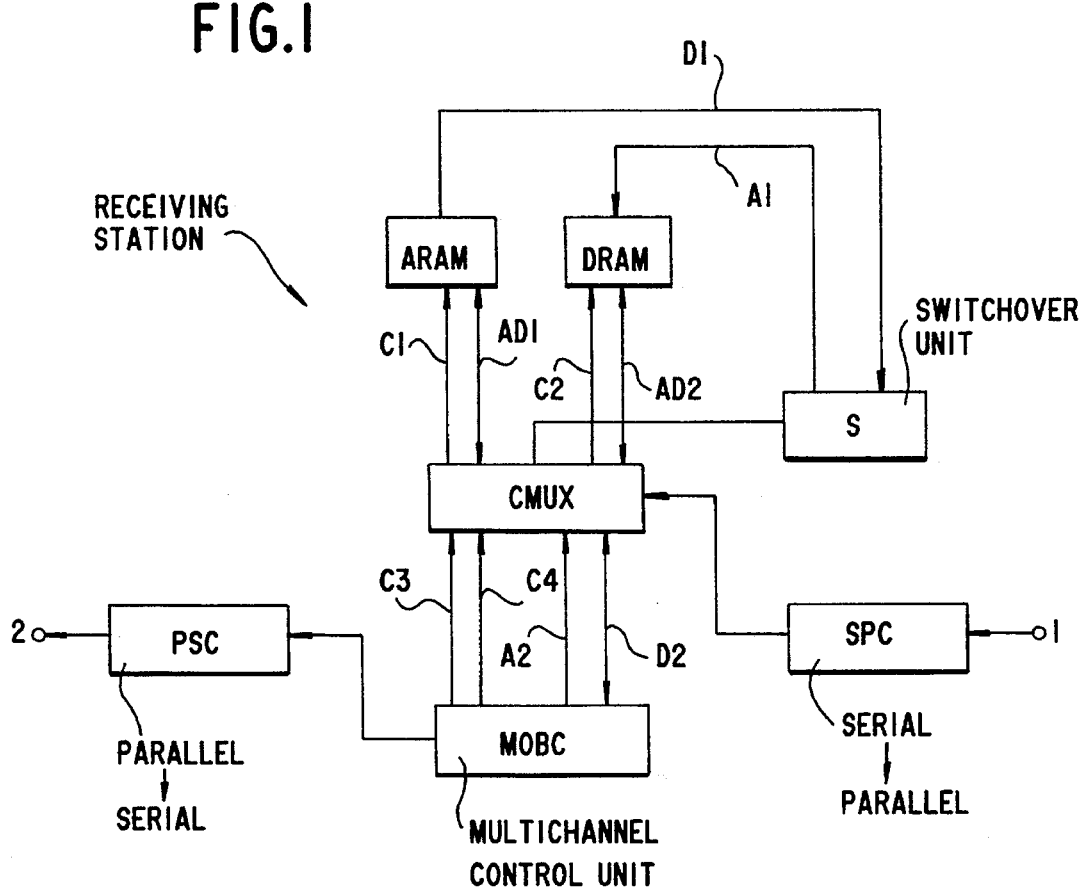
FIG. 1 is a block circuit diagram of an apparatus according to the invention for performing the method of the invention for a receiving station.

Referring now to the figures of the drawing in detail and first, particularly, to FIG. 1 thereof, there is seen an input terminal 1, which is supplied serially with data from a transmission channel. For the sake of simplicity, no other channels have been shown in this case. In a system with internal parallel data transmission, the other channels would be disposed parallel to this transmission channel. In a transmitting or receiving system with internal serial transmission, the various channel data are supplied to the input terminal 1 by a time division multiplexing method. The input terminal 1 is connected to an input of a serial-to-parallel converter SPC. An output of the serial-to-parallel converter SPC is connected to one input of a control multiplexer CMUX.

The other possible but non-illustrated channels may be connected to the control multiplexer CMUX in the same way. The multiplexer CMUX is connected to a multichannel control device MDBC over a read/write line C3, a control line C4, address lines A2 and data lines D2. The multichannel control device MDBC is connected to a parallel-to-serial converter PSC. The parallel-to-serial converter PSC is connected to an output terminal 2 at which serial output signals can be picked up. For parallel-processing receivers, once again only one output channel has been shown, for the sake of simplicity. The multiplexer CMUX is connected to an address RAM ARAM over control lines C1 and address lines AD1. A data memory DRAM is likewise connected to the multiplexer over a control line C2 and address data lines AD2. Finally, a switchover unit S is controlled by the multiplexer CMUX. The switchover unit has an input that is connected to further data lines D1 of the address memory ARAM and an output that is connected to address lines A1 which lead to the data memory DRAM.

Figure 2:
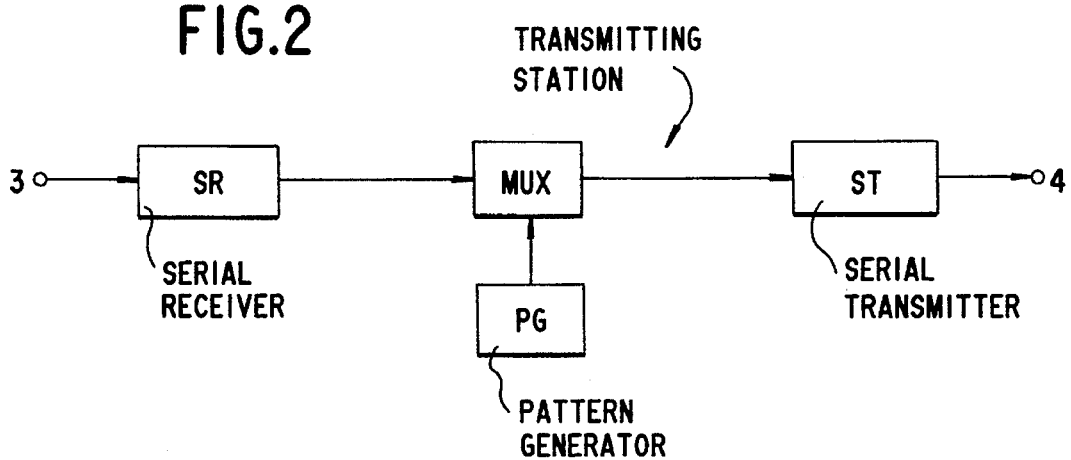
FIG. 2 is a block circuit diagram of an apparatus for performing the method of the invention in a transmitting station.

FIG. 2 shows one possible embodiment of a unit for carrying out initialization with a serial receiving component SR having an input which is supplied with serial input data over an input terminal 3 and having an output which is connected to a first input of a multiplexer MUX. A second input of the multiplexer MUX is connected to a pattern generator circuit PG. An output of the multiplexer MUX is connected to a serial transmission unit ST having an output that is connected to an output terminal 4 at which the serial output data can be picked up.

The method of the invention will be described in further detail below in conjunction with FIG. 3. Four transmission and four reception channels are shown by way of example in table form in FIG. 3. Four transmission channels 5, 10, 12 and 19 should have been selected by the switching station for parallel data transmission. Transmission over the various transmission channels 5, 10, 12, 19 should then take place to receiving channels 2, 6, 17 and 20 in the receiver. The transit times of the various channels differ and are unknown, but during the entire transmission for which these channels have been selected, it is constant.

The transmitter sends a data word "00", for instance, over all of the channels for initialization. It is assumed that in the reception channels at that moment, arbitrary values or values FF(HEX) by way of example, are present. Since the transit time in the various transmission channels differs, it can be seen in the top right portion of FIG. 2 that the initializing values transmitted by the transmitter are received at different times. In the upper right part of FIG. 2, the time axis is defined as extending from top to bottom. At a time $t_2$, channel 6 receives the initializing word sent by channel 10. Channel 20 receives it at a time $t_3$, channel 17 receives it at a time $t_4$, and channel 2 receives it at a time $T_5$. At the time t5, all of the channels are set to the initializing value, and the receiving station can ascertain from these values the absolute time offset, for instance, until the initializing word is received by the channel having the transmission time which is shortest. In a second step, the measurement of the relative time offset between the various channels takes place. To that end, the transmitting station, beginning at an arbitrary starting value such as 01, begins a continuous succession of numbers over all of the channels. This is shown in the lower part of FIG. 3. Thus a numerical sequence 01, 02, 03, etc. is sent simultaneously over all of the transmission channels. The starting value and the following values are supposed to be different from the initializing word sent beforehand in the first step, since the receiver, at the moment when all of the channels have different values in comparison with the initializing value, can ascertain the relative time offset between the various receiving channels. In the example shown, this occurs at a time t6. From the time t6 on, the relative time offset between the various channels remains constant, as long as the connection is maintained. The receiving station can then ascertain the relative time offset from the differential values, and can output the various partial transmission in the correct order again by means of a device shown in FIG. 1, so that the data packet sent by the transmitter resumes its original form.

During the initializing phase, the pattern generator circuit or unit PG shown in FIG. 2 serves to output the succession of numbers to the transmission channels. The numerical succession need not necessarily have the order shown above. It may, for instance, be configured differently. During the initializing phase, the multiplexer of FIG. 2 serves to transmit this desired numerical succession over the transmission channels that are chosen. In normal operation, it is then switched back to the serial receiving unit SR, which is supplied by the transmitting data station.

The receiving station can have a device shown in FIG. 1 in order to ascertain the time offset. To that end, the time offset values ascertained in FIG. 3, while being directly obtained from the difference in the values received in the various channels at the time $t_6$, can be stored in the address memory ARAM. While the data of the channels are being written in, they are polled by the multiplexer and stored sequentially, or in other words in the order in which they were received, in the data memory DRAM over the control line C2 and the address data line AD2. The multichannel control unit MDBC controls this process. The data memory DRAM may, for instance, be constructed as a ring memory and must have a capacity that can hold at least enough data values of the transmitter to ensure that both the absolute and the relative time offset in data transmission will be learned. The multichannel control unit MDBC also serves to read the data memory DRAM again, but then in such a way that the data are then output in the correct order at the output 2. For that purpose, the addressing of the data memory DRAM is controlled through the switching unit S. In the process, both the address memory and the data memory are triggered sequentially, but by means of this address memory ARAM, the addresses are converted into the previously ascertained offset addresses and are deposited through the switching unit in the data memory DRAM. The data memory then outputs the chronologically correct value over its data line AD2 to the multiplexer CMUX and to the multichannel control unit MDBC, and in this way the partial data transmission received over the various receiving channels can then be output again by the multiplexer and the multichannel control unit in their correct order through the connection terminal 2.

Instead of the unit shown in FIG. 1, it is understood that a processor can also be used, which places the data into the desired order again from the ascertained time offset values using software.

We claim:

1. A method for data transmission in a system having n transmission channels, a transmitting station and a receiving station, m channels ($n \geq m \geq 0$) of the n channels for transmitting data, and each of the m channels effecting a partial data transmission, the method which comprises:

determining a time offset with the receiving station over each of the m transmission channels during an initializing phase, by:

simultaneously transmitting a predetermined initializing value from the transmitting station to all of the channels;

transmitting a confirmation signal from the receiving station over at least one of the m channels to the transmitting station, if all of the m channels in the receiving station have received the predetermined initializing value;

transmitting, from the transmitting station over all of the m channels, a numerical sequence beginning with a predetermined starting value, after receiving the confirmation signal; and determining and taking into account the time offset between the various channels for an ensuing data transmission at the receiving station from the relative offset of the data values received in the various channels, after a data value has been received over all of the m channels which has a different value than the predetermined starting value of the numerical sequence.

2. The method according to claim 1, which comprises generating the numerical sequence with a pattern generator circuit in the transmitting station after the predetermined initializing value is present in all m channels at the receiving station.

3. A system for transmitting data, comprising n transmission channels, a transmitting station and a receiving station, m channels of said n channels ($n \geq m \geq 0$) for transmitting data, and each of the m channels effecting a partial data transmission, said transmitting station including means for simultaneously transmitting a predetermined data value on each of said m channels;

said receiving station including an address memory, a data memory and control means;

said receiving station transmitting a confirmation signal to said transmitting station after having received the predetermined data value on all of said m channels;

said transmitting station, after receiving the confirmation signal, transmitting over all of the m channels a numerical sequence beginning with a predetermined starting value;

said receiving station ascertaining time offset values from the data values received in the various channels;

said address memory storing the ascertained time offset values to form offset addresses;

said data memory sequentially storing received data under control of said control means;

said control means controlling addressing and reading out of said data memory with the offset addresses stored in said address memory; and said control means assigning the read-out data to an output channel.

4. The system according to claim 3, including a pattern generator circuit in the transmitting station for generating a numerical sequence.

* * * * *